US007026038B2

(12) United States Patent
Franzoi et al.

(10) Patent No.: US 7,026,038 B2
(45) Date of Patent: Apr. 11, 2006

(54) WEAR RESISTANT LAMINATES

(75) Inventors: Eric Franzoi, Pasadena, MD (US); Scott Laprade, Baltimore, MD (US); Srikanth Prasad, Rockville, MD (US)

(73) Assignee: Nevamar Company, LLC, Hanover, MD (US)

( * ) Notice: Subject to any disclaimer, the term of this patent is extended or adjusted under 35 U.S.C. 154(b) by 333 days.

(21) Appl. No.: 10/108,854

(22) Filed: Mar. 29, 2002

(65) Prior Publication Data

US 2002/0146545 A1 Oct. 10, 2002

Related U.S. Application Data

(60) Provisional application No. 60/280,996, filed on Apr. 4, 2001.

(51) Int. Cl.

*B32B 3/00* (2006.01)
*B32B 3/10* (2006.01)
*B32B 7/02* (2006.01)
*B32B 23/02* (2006.01)

(52) U.S. Cl. .................. 428/195.1; 428/206; 428/137; 428/144; 428/191; 428/212

(58) Field of Classification Search ................ 428/195, 428/206, 137, 144, 191, 212

See application file for complete search history.

(56) References Cited

U.S. PATENT DOCUMENTS

| | | | | |
|---|---|---|---|---|
| 4,117,198 | A * | 9/1978 | Power et al. | 428/452 |
| 4,255,480 | A | 3/1981 | Scher et al. | |
| 4,376,812 | A * | 3/1983 | West | 428/165 |
| 4,473,613 | A * | 9/1984 | Jaisle et al. | 428/220 |
| 4,499,137 | A | 2/1985 | O'Dell et al. | |
| 4,517,235 | A * | 5/1985 | Ungar et al. | 428/148 |
| 4,520,062 | A * | 5/1985 | Ungar et al. | 428/148 |
| 4,532,170 | A | 7/1985 | O'Dell et al. | |
| 4,567,087 | A | 1/1986 | O'Dell et al. | |
| 4,713,138 | A | 12/1987 | Ungar et al. | |
| 4,971,855 | A | 11/1990 | Lex et al. | |
| 5,037,694 | A | 8/1991 | Ungar et al. | |
| 5,093,185 | A * | 3/1992 | Ungar et al. | 428/204 |
| 5,141,799 | A * | 8/1992 | Mehta et al. | 428/207 |
| 5,288,540 | A * | 2/1994 | Albrinck et al. | 428/208 |
| 5,344,704 | A | 9/1994 | O'Dell et al. | |
| 5,362,557 | A * | 11/1994 | Albrinck et al. | 428/323 |
| 5,422,168 | A | 6/1995 | O'Dell et al. | |
| 5,456,949 | A * | 10/1995 | Albrinck et al. | 427/411 |
| 5,500,668 | A * | 3/1996 | Malhotra et al. | 347/105 |
| 5,545,476 | A | 8/1996 | O'Dell et al. | |
| 5,558,906 | A * | 9/1996 | Albrinck et al. | 427/180 |
| 5,651,795 | A | 7/1997 | Gurley | |
| 5,731,034 | A | 3/1998 | Husband | |
| 5,885,678 | A * | 3/1999 | Malhotra | 428/32.29 |
| 5,891,827 | A | 4/1999 | Brust et al. | |
| 6,093,473 | A * | 7/2000 | Min | 428/147 |
| 6,290,815 | B1 * | 9/2001 | Magnin et al. | 162/181.1 |
| 6,440,538 | B1 * | 8/2002 | Ungar | 428/195 |
| 2002/0025426 | A1 * | 2/2002 | Karam | 428/329 |

* cited by examiner

*Primary Examiner*—Rena Dye
*Assistant Examiner*—Lawrence Ferguson
(74) *Attorney, Agent, or Firm*—Fish & Neave IP Group Ropes & Gray LLP

(57) ABSTRACT

Laminates of improved wear resistant are made using decor sheets prepared by treating printed décor paper with a mordant so that decorative ink is bonded to the paper. The decor sheets are then suitable for use in high pressure or low pressure laminates.

7 Claims, No Drawings

WEAR RESISTANT LAMINATES

FIELD OF THE INVENTION

The present invention relates to improved wear resistant laminates and a method for making such wear resistant laminates.

BACKGROUND OF THE INVENTION

Low-pressure laminate, often called "low-pressure board", is a well known, industrially important, and moderate to low cost product used in many industries including the furniture industry. In general, it is formed by a "low pressure" laminating procedure using a suitable substrate and a decorative paper facing sheet, i.e. a paper decor sheet, which may be a solid color or have a design, e.g. a wood grain design, printed on its surface and which is impregnated with a thermosettable resin such as melamine-formaldehyde resin, often simply called "melamine resin", some other amino resin such as urea-formaldehyde resin, or an unsaturated polyester resin, and optionally with a similar resin impregnated barrier sheet interposed between the substrate and the decor sheet.

The substrate can be formed of a variety of materials, such as thermosettable resin impregnated paper sheets, but more usually plywood, chipboard, fiberboard such as MASONITE® fiberboard, particleboard, wafer board or the like. Examples of such low pressure laminates are described in O'Dell et al U.S. Pat. No. 5,422,168, the entire contents of which are hereby incorporated by reference.

High pressure decorative laminates are laminates which meet a number of critical industry standards promulgated by NEMA, i.e. NEMA standards. These laminates are and have for many years been conventionally produced by stacking and curing under heat and pressure a plurality of layers of paper impregnated with various synthetic thermosetting resins. In normal practice, the assembly from the bottom up consists of a plurality, e.g. three to eight, core sheets made from phenolic resin impregnated Kraft paper, above which lies a decor sheet impregnated with melamine resin. A protective overlay sheet is often provided on top of the decor sheet. This overlay sheet, hereinafter simply "overlay", is almost transparent in the laminate and provides protection for the decor sheet.

However, it is cumbersome and unduly costly to use overlay in the manufacture of a low pressure laminate, wherein the low cost of the product is important, which means that many print designs are unfit for use in a low pressure laminate due to poor abrasion resistance.

In both high pressure and low pressure laminates, the decor sheet may be a high quality, 50–125 lbs. ream weight (81.5 to 203.75 g/$m^2$), pigment filled paper that has been impregnated with a water-alcohol solution of melamine resin, dried and partially cured, and finally cut into sheets. As indicated above, the decor sheet, prior to impregnation with the resin, may have been printed with a decorative design, or with a rotogravure or inkjet printed reproduction of natural materials, such as wood, marble, leather, etc. Alternatively, the decor sheet is solid colored. Conventionally, ink is used to produce the printed design on the decor sheet. In recent years, the trend in the printing industry has been to replace organic solvent based inks with water based inks.

Examples of high pressure decorative laminates are found in, among others, Scher et al U.S. Pat. No. 4,255,480; Ungar et al U.S. Pat. No. 4,713,138; Ungar et al U.S. Pat. No.

5,037,694; O'Dell et al U.S. Pat. No. 4,499,137; O'Dell et al U.S. Pat. No. 4,532,170; O'Dell et al U.S. Pat. No. 4,567,087; O'Dell et al U.S. Pat. No. 5,344,704; and O'Dell et al U.S. Pat. No. 5,545,476, the entire contents of which are hereby incorporated by reference.

A protective coating, such as NEVAMAR ARP® and/or "Armored Protection Plus" as per at least some of the above noted patents, often eliminates the need for overlay to protect the printed surface of the high pressure laminate. Elimination of the overlay improves visual clarity of the appearance of the decor sheet. In the ARP® and/or "Armored Protection Plus" technologies, the surface layer which protects the decor sheet from abrasion is an overcoating which is greatly reduced in thickness, compared to overlay, so as to provide a highly concentrated layer of abrasion resistant particles or other protective particles bound to the upper surface of the uppermost paper layer, usually the decor sheet.

As noted above, in many high pressure decorative laminate products meeting NEMA standards and having a printed surface, the printed surface is protected by the overlay. In some of these decorative laminates, a protective coating such as the aforementioned ARP® eliminates the need for an overlay, such that the printed surface is very close to the uppermost surface of the laminate, making a quality bond between the ink and the paper a critical parameter for product performance. The ARP® and "Armored protection plus" technologies have served the industry exceedingly well, and high pressure decorative laminate incorporating ARP® and/or "Armored Protection Plus" usually well exceed NEMA abrasion resistance standards. Unfortunately, however, in the absence of an overlay, some surface printed designs, especially those based on aqueous ink systems, show unacceptable, premature wear, even when protected by such a protective coating.

Mordants are well known compounds of various types which are commonly used to bond dyes to textile fibers, e.g. by linking to both the dye molecule and the fiber molecule. Mordants are particularly used with dyes, called "mordant dyes" or "lake pigments", which have little or no substantively or affinity for textile fibers. "Mordant" and "mordant dye" are defined in "Grant & Hackh's Chemical Dictionary", 5$^{th}$ edition (1987) as follows:

Mordant A chemical used for fixing colors on textiles by absorption; as, soluble salts of aluminum, chromium, iron, tin, antimony m.dye An artificial or natural color for fibers which usually forms an insoluble metal compound (lake) with metallic salts (mordant).

The Condensed Chemical Dictionary, 9$^{th}$ edition, defines these terms as follows:

Mordant A substance capable of binding a dye to a textile fiber. The mordant forms an insoluble lake (q.v.) in the fiber, the color depending on the metal of the mordant. The most important mordants are trivalent chromium complexes, metallic hydroxides, tannic acid, etc. Mordants are used with acid dyes, basic dyes, direct dyes, and sulfur dyes. Premetalized dyes contain chromium in the dye molecule. A mordant dye is a dye requiring use of a mordant to be effective. See also dye, fiber-reactive.

Such mordant dyes are applied to cellulosic or protein fibers that have been pre-treated (mordanted), usually with metallic oxides, to give points of attraction of the later applied dye. The dye forms a complex with the mordant and, depending upon the particular metal and fiber, can form a large molecule which is less capable of desorbing from the fiber, or can form a dye molecule bound to the fiber resulting from chelation with the metal. Some effective dyes result from introducing metals such as chromium and cobalt into dye molecules to produce larger molecules; these complexes can be formed by chelating one or two molecules of a dye with the metal.

The most commonly used mordants for natural dyes are alum (potassium aluminum sulfate), chrome (potassium dichromate or potassium bichromate), blue vitriol (copper sulfate), ferrous sulfate, stannous chloride, sodium dithionite or sodium hydrosulfite, ammonium hydroxide, cream of tartar (potassium bitartrate), "glauber's salt" (sodium sulfate), lime (calcium oxide), lye (sodium hydroxide), oxalic acid, tannic acid, urea, vinegar (acetic acid), and washing soda (sodium carbonate). Other mordants used include salts of iron, copper, tin, and other heavy metals. Still other mordants include citric acid or mixtures of an aluminum salt, citric acid, and a carbonate, such as disclosed in Gurley et al U.S. Pat. No. 5,651,795, the entire contents of which are hereby incorporated by reference.

SUMMARY OF THE INVENTION

It is accordingly an object of the present invention to overcome deficiencies in the prior art, such as those indicated above.

It is another object of the present invention to provide improved low pressure board which is economical and which has a wear resistant print design.

It is another object of the present invention to provide improved high pressure decorative laminate which is economical and which has a print design of improved wear resistance.

It is another object of the present invention to provide a decor sheet having an improved printed surface, which can be successfully used in the manufacture of wear resistant laminates.

These and other objects of the present invention are achieved by treating unprinted décor paper, or more preferably surface printed décor paper, with a mordant to bond décorative ink to the paper. The paper is treated by impregnating the unprinted or preferably pre-printed paper with a solution of the mordant by immersing the paper in a solution of the mordant, or by coating a solution of the mordant onto the paper, preferably prior to resin impregnation. Of course, if the décor paper is initially unprinted at the time of treatment with the mordant, it must subsequently be printed; it is preferred that the paper be pre-printed. Alternatively, the mordant most prefereably is added to the conventional laminating resin formulation, e.g. the mordant is added to the melamine resin solution used to impregnate the pre-printed sheet. This latter method eliminates an additional mordant treatment step and simplifies the process.

DETAILED DESCRIPTION OF THE INVENTION

It has been surprisingly discovered according to the present invention that mordants can be used to bond ink to paper, even if the paper is pre-printed, which in one test resulted in improving the wear resistance of the print design on the printed paper from 25 abrasion cycles on a Taber abrader to over 500 cycles. Also surprisingly, it was found that certain embodiments of ARP® and/or "Armored Protection Plus" (see O'Dell et al U.S. Pat. No. 5,344,704) laminates, which already had excellent wear resistance could be greatly improved by using a mordant to bind the ink to the paper.

In one preferred embodiment of the invention, the printed paper is dipped into a solution of the mordant, such as a 5% solution of citric acid, dried at approximately 250° F. (121° C.), and used as the top sheet in the conventional low pressure or high pressure laminating process. Alternatively, a solution of the mordant is applied by coating the paper, drying the paper, and rewinding the paper on a roll to be treated in the conventional laminating process. Generally, the mordant in these instances is applied in an amount of approximately 0.1 to about 1.0 gram per square foot (0.009 to 0.093 g/m$^2$) of paper, particularly in the manufacture of general purpose high pressure decorative laminate. However, a broader range is usable, i.e. 0.05 to 0.30 g/ft$^2$, i.e. 0.0045 to 0.28 g/m$^2$.

In another preferred embodiment, the mordant, e.g. calcium acetate, is incorporated in the laminating resin solution impregnated into the print sheet used as the top sheet in the manufacture of low pressure board or high pressure decorative laminate. In this embodiment, the paper, after impregnation, is dried in the usual way. Calcium acetate is a preferred mordant for use in conjunction with a resin which is acid catalyzed. The minimum effective quantity of calcium acetate mordant is about 0.359 g/m$^2$ which equals about 0.22 lbs. per ream of printed décor paper of typical 65 lb. basis weight, it being noted that a ream equals 3000 ft$^2$. Incorporating the mordant into the resin is the most preferred operation because it avoids an additional and separate mordant treating step and a consequent drying or partial drying step, and is therefore less expensive operationally.

A wide variety of mordants can be used. Successfully tested so far have been citric acid, aluminum phosphate, calcium acetate, aluminum sulfate, sodium formate and a zirconium compound sold under the name of Protec ZA7 by MEI Corp. of New Jersey. Other mordants can be routinely tested for suitability in conjunction with the present invention.

Similarly, quantities of such mordants can also be routinely tested. In general, however, a minimum effective quantity is about 0.1% based on the weight of the printed paper. This minimum will of course vary, depending on a number of variables including the printing ink, the quantity of printing ink, used in the print, the nature and weight of the décor paper, the particular laminating resin solution used, and the particular mordant selected. There appears to be no maximum amount of mordant from the standpoint of the improvement of wear resistance obtained, but on the other hand no benefit is achieved by using more than about 1% mordant based on the weight of the printed paper, and costs increase in the use of increasing amounts; and post forming of the laminate is adversely affected with quantities exceeding about 3.3 lbs/ream (5.38 g/m$^2$) when calcium acetate or other mordants more acidic than the resin is used as the mordant in conjunction with a basic resin. Moreover, the maximum amount of mordant is also limited by the solubility of the mordant in its application solution, as undissolved mordant would cloud the print design.

Except for the mordant treatment of the paper and certain other preferred compositional changes mentioned below, the laminates of the present invention are suitably made according to standard practice and suitably have a conventional construction. For example, high pressure decorative laminate can comprise 2 to 8 core sheets formed of phenolic resin impregnated Kraft paper, with a melamine resin impregnated printed decor sheet thereover, wherein the decor sheet has been treated with a mordant as noted above. The final high pressure decorative laminate is made in the conventional way such as by stacking the core layers within a suitable press with the decor sheet facing a pressing plate die, and subjecting the assembly to sufficient heat and pressure for a time sufficient to produce the desired decorative laminate, using well known parameters of temperature, time and pressure, i.e. the conditions of pressing for both high pressure laminates and low pressure laminates are standard and well known.

Use of a mordant to anchor the ink to the surface of the paper enables certain compositional changes. Most importantly, microcrystalline cellulose is preferably not included as a component of the protective overcoating, unless such overcoating is applied in a separate operation. If the mordant is applied to the printed paper as part of the laminating resin, another type of thickening and suspending agent is used, namely one which is non-ionic or cationic, preferably non-ionic. A number of such thickening agents can be used including water soluble polymers such as polyvinyl alcohol, polyvinyl pyrrolidone, cellulose derivatives such as carboxyl methyl cellulose, hydroxypropyl cellulose and methyl cellulose, gums such as alginates, clays and fumed silica. Preferred, however, are certain non-ionic synthetic clays, such as those based on a modified synthetic magnesium silicate with pronounced platelet structure, i.e. a type of synthetic hectorite, clays of this type being available from Sud Chemie under the Optigel trademark, or from LaPorte under the Laponite trademark. These synthetic minerals hydrate in water and expand, constituting good thickening and suspending agents which do not interact with other components. Mixtures of various thickening and suspending agents can also be used.

The main function of such thickening and suspending agents is to simply maintain the particulate matter in the composition, most particularly alumina which provides the ARP® protective overcoating, from settling out of the resin impregnating composition during coating and impregnating of the printed décor sheet. If no such particles are to be provided in the laminating resin composition, then such a thickening and suspending agent is unnecessary. However, when such particles are present, and bearing in mind the aforementioned function of the suspending and thickening agent, it will be understood that the quantity of thickening and suspending agent should be preferably be kept to a minimum while still providing a sufficient quantity to provide such thickening and suspension. Too much thickening agent can result in undesirable gelling which makes impregnation of the print sheet very difficult. Accordingly, depending on what is in the resin impregnating composition including the solids content of uncured resin and other components, and also the particular suspension agent or combination of suspension agents selected, the quantity of such suspension agent to be used will be determined by routine experimentation.

A particularly preferred suspension agent for use in the present invention is a synthetic magnesium silicate sold by Sud Chemie under the trademark optigel S482. This synthetic clay includes a liquefier which acts as a wetting agent. Optigel S482 has been found easier to use in that the larger quantities of this material can be used in the resin impregnating solution containing the mordant without causing gelation, and is especially preferred when the mordant selected is calcium acetate.

The present invention also permits the quantity of alumina in the protective ARP® and "Armored Protection Plus" overcoatings to be significantly reduced, while at the same time providing superior abrasion resistance. Very surprisingly, and at present we have no theoretical explanation for this effect, reduced quantities of the abrasion resistant alumina particles provide better results than greater quantities.

According to another aspect of the present invention, silica gel having a mean particle size of about one-half the mean particle size of the alumina is added to the protective ARP® and/or "Armored Protection Plus" overcoating and resin laminating compositions. Thus, if an alumina of preferred mean particle size such as in the range of about 30–35 μm, e.g. 33 μm, is used to provide the main part of the abrasion resistant particles of the protective overcoating, then silica gel of about 15 μm is used as a packing agent to fill in between the alumina particles. This expedient permits the reduction of the quantity of alumina particles by about 50–70%, at the same time providing a smoother protective overcoating.

The present invention is particularly suitable for the manufacture of low pressure laminate because it provides improved wear resistance in a relatively inexpensive way, and in a product in which wear resistance is relatively poor when not made according to the present invention.

The following examples are offered illustratively.

EXAMPLE 1

Low pressure board is made according to the process of the aforementioned O'Dell U.S. Pat. No. '168, wherein the décor sheet has a printed wood grain pattern on its upper surface. The pre-printed décor sheet is first impregnated with an aqueous solution of citric acid at the rate of 0.6% by weight of citric acid based on the weight of the paper, and the paper is then dried. Such paper is then processed according to example 1 of O'Dell '168. Wear resistance of the resultant low pressure board is increased substantially.

EXAMPLE 2

Décor paper pre-printed with a woodgrain pattern on its upper surface is impregnated with a 5% solution of citric acid so as to provide 0.8% by weight of citric acid based on the weight of the paper. After drying, the paper is processed according to example 3 of O'Dell U.S. Pat. No. '168. Again, the wear resistance is significantly improved compared with the otherwise identical example 3 of O'Dell '168.

EXAMPLE 3

High pressure decorative laminate is made according to Example 1, run 4 of the Scher et al U.S. Pat. No. 4,255,480, but using a décor paper with a surface print applied by a water-based ink, and known to be difficult to protect against abrasive wear. Abrasion resistance is found to be unsatisfactory even though the surface of the print is covered with a protective overcoating.

The exactly same procedure is carried out, except that the printed décor sheet is first treated with a 4% solution of citric acid to incorporate into the print sheet 0.5% by weight of citric acid based on the weight of the paper. The paper is then dried and the process of Example 1, run 4 of Scher '480 is again carried out. Wear resistance is improved to over 500 cycles on the Taber abrader.

EXAMPLE 4

High pressure decorative laminate is made according to Example 4 of Ungar et al U.S. Pat. No. 4,713,138, using décor paper made according to Example 1 of Ungar '138 with the following changes. The décor paper is a surface-printed paper known to be difficult to protect, and the melamine resin impregnating solution contains no polyethylene powder and no AVICEL™. In place of the AVICEL™, a mixture of clay and carboxymethyl cellulose is used as the thickening and suspension agent. The resin solution further contains, as a mordant, 0.2% of aluminum phosphate based on the weight of the melamine resin. Wear resistance of the resultant high pressure decorative laminate is excellent.

EXAMPLE 5

Example 4 above is repeated, except that the melamine resin impregnating composition is in accordance with example 3 of Ungar '138 with the following changes. Again the polyethylene powder is eliminated as is the AVICEL™. In place of the AVICEL™, Optigel S482 (a synthetic magnesium silicate clay) is used as the thickening and suspension agent. As mordant, there is used 0.25%, based on the weight of the melamine resin, of Protec ZA7, a zirconium compound sold by MEI Corp. The resultant high pressure decorative laminate has excellent abrasion resistance.

EXAMPLE 6

Example 5 is repeated using fumed silica in place of Optigel S482. Although good results are achieved with respect to abrasion resistance, processing is easier in Example 5 as compared with Example 6.

EXAMPLE 7

Melamine resin solution in an amount of 510.75 gms at 55% solids was mixed for 30 seconds at high speed in a KD mill type blender with 27.28 gms of Optigel S482 (25% solution in water). Next, 0.2% (1.0 gm) to 0.5% (2.5 gms) of calcium acetate as mordant was added based on the weight of melamine resin. The mixing was continued at high speed for 2 minutes. Next, 0.1 gm of Agitan 305 defoamer, 0.16 gm of release agent and 0.16 gm of wetting agent were added and mixing was continued at a low speed without causing foaming.

Next, there was added 5.68 g of sifted alumina having a mean particle size of 33 microns, and 30 seconds later 8.52 g of silica gel (Syloid 620) having a mean particle size of 12 microns was added. Finally, a curing catalyst for the melamine resin was blended into the melamine resin coating and impregnating composition.

A print sheet, known to be difficult to protect from abrasive wear, was then impregnated and coated with the so-prepared melamine resin composition. After drying, the print sheet was used to make high pressure decorative laminate. The resulting high pressure decorative laminate was a general purpose or non-postformable grade laminate with excellent abrasion resistance.

The addition of silica gel provides good abrasion resistance in spite of the low loading level (0.2–0.5%) of calcium acetate as mordant in the resin formulation. Also, the use of silica gel as a packing agent to fill in between the larger alumina particles helped lower the loading level of alumina in melamine resin by at least 50%. The silica gel also acted as a protective shim between the laminate and the press plate and resulted in greatly reducing the plate wear. The silica gel also eliminated any need for procured resin particles as per O'Dell U.S. Pat. No. '704 in the melamine resin formulation.

EXAMPLE 8

Example 7 above was repeated but using 4.25 gms of Optigel S482 powder instead of 27.28 gms of Optigel solution. The Optigel S482 powder was mixed into melamine resin solution for 5 minutes at high speed in a KD mill type blender. Again, the range of calcium acetate as mordant used was the low loading level of 0.2–0.5%. The high pressure decorative laminate made as a result of this formulation is non-postformable or general purpose grade and had excellent abrasion resistance.

EXAMPLE 9

Both examples 7 and 8 were repeated, except that the resin solution further contained 5% by weight of resin of diethylene glycol or 5% by weight of a resin of caprolactum solution (sold by Borden under the trade name of Astro Add CL) as resin plasticizers. The resulting high pressure laminate was postformable and had excellent abrasion resistance.

EXAMPLE 10

Both examples 7 and 8 were repeated, except that the melamine resin solution in an amount of 510.75 gm at 55% solids contained 5 g calcium acetate, i.e. the mordant was present at loading levels greater than 0.5% but not exceeding 1% based in the weight of resin. Further, no silica gel was added to the resin formulation. The alumina loading was increased from 5.68 gms to 14.2 gms. Because no silica gel was present in the resin, 14.2 gms of pre-cured melamine resin particles (a 1:1 ratio with the alumina grit) was added to the melamine resin to protect the plates from excessive wear. The resulting high pressure decorative laminate was a general purpose or non-postformable grade laminate with excellent abrasion resistance.

At this higher loading level of calcium acetate (0.5–1.0%) in the melamine resin impregnating composition, the mordant by itself produces excellent abrasion resistance and does not require the presence of silica gel. But a drawback of this formulation when using a melamine resin which is less acidic than the mordant is that the high levels of calcium acetate causes a high shift in resin pH due to the acidic nature of the mordant salt; therefore one would need to add a considerably larger amount of plasticizer to provide a postformable laminate.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

What is claimed is:

1. A high pressure decorative laminate including a décor sheet bonded to a substrate, and a protective overcoating comprising particles of an abrasion resistant mineral said décor sheet comprising paper having a print on a surface thereof, and said décor sheet being impregnated with a thermosettable resin and a mordant, said mordant adhering said print to said surface, and wherein the abrasion resistant mineral particles comprise larger particles and smaller particles, said smaller particles having a mean particle diameter of approximately one-half of said larger particles.

2. The décor sheet of claim 1 wherein the paper sheet is formed of cellulose.

3. The décor sheet of claim 1 wherein said mordant is selected from the group consisting of citric acid, aluminum phosphate, sodium format, calcium acetate, aluminum sulfate, zirconium salts, potassium aluminum sulfate, potassium dichromate or bichromate, copper sulfate, ferrous sulfate, stannous chloride, sodium dithionite, sodium hydrosulfite, ammonium hydroxide, potassium bitartrate, sodium sulfate, calcium oxide, sodium hydroxide, oxalic acid, tannic acid, urea, acetic acid, sodium carbonate, iron salts, copper salts, tin salts, citric acid, calcium acetate and mixtures thereof.

4. The décor sheet of claim 1 wherein said print is from a water-based ink.

5. The decorative laminate of claim 1 wherein said larger particles are alumina particles of a mean particles size of approximately 30~35 μm, and said smaller particles are silica gel particles.

6. The decorative laminate according to claim 1 wherein the mordant is applied in an amounts of from about 0.0045 to 0.28 g/m$^2$ of paper.

7. The décor sheet of claim 3 wherein the mordant is selected from the group consisting of calcium acetate, aluminum phosphate and citric acid.

* * * * *